US012703609B2

(12) United States Patent
Hu et al.

(10) Patent No.: US 12,703,609 B2
(45) Date of Patent: Aug. 11, 2026

(54) AUTOMATIC CONVEYOR DEVICE

(71) Applicant: Otis Elevator Company, Farmington, CT (US)

(72) Inventors: Xiren Hu, Hangzhou (CN); De Wu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 49 days.

(21) Appl. No.: 18/802,338

(22) Filed: Aug. 13, 2024

(65) Prior Publication Data

US 2025/0059005 A1 Feb. 20, 2025

(30) Foreign Application Priority Data

Aug. 14, 2023 (CN) ........................ 202311022733.0

(51) Int. Cl.
*B66B 29/06* (2006.01)

(52) U.S. Cl.
CPC .................................. *B66B 29/06* (2013.01)

(58) Field of Classification Search
CPC ............................... B66B 29/06; B66B 23/08
See application file for complete search history.

(56) References Cited

U.S. PATENT DOCUMENTS 2,016,104 A * 10/1935 Cooper .................. B66B 29/06 198/325

FOREIGN PATENT DOCUMENTS

| | | | | | |
|---|---|---|---|---|---|
| CN | 109502468 | A | * | 3/2019 | B66B 29/06 |
| CN | 210558831 | U | * | 5/2020 | |
| CN | 220467268 | U | * | 2/2024 | |
| CN | 119429915 | A | * | 2/2025 | B66B 29/06 |
| EP | 1157958 | A1 | * | 11/2001 | B66B 29/06 |
| JP | 2006264851 | A | * | 10/2006 | |
| JP | 2014163104 | A | * | 9/2014 | |
| JP | 2020158221 | A | * | 10/2020 | |
| WO | WO-0210041 | A1 | * | 2/2002 | B65G 43/06 |

OTHER PUBLICATIONS

IPSearch History Nov. 26, 2025 UTC; InnovationQ+; https://iq.ip.com/discover (Year: 2025).*
European Search Report for Application No. 24193967.7, Issued Jan. 17, 2025, 8 Pages.

* cited by examiner

*Primary Examiner* — Gene O Crawford
*Assistant Examiner* — Abby A Jorgensen
(74) *Attorney, Agent, or Firm* — CANTOR COLBURN LLP

(57) ABSTRACT

An automatic conveyor device includes an entrance platform and an exit platform opposite to each other, and a series of steps running in a loop between the entrance platform and the exit platform; a platform footboard at the entrance platform or exit platform; a comb support plate connected to the platform footboard and slidable along guide rails of the platform footboard along a length direction; and one or more comb plates fixedly mounted onto the comb support plate.

12 Claims, 10 Drawing Sheets

AUTOMATIC CONVEYOR DEVICE

FOREIGN PRIORITY

This application claims priority to Chinese Patent Application No. 202311022733.0, filed Aug. 14, 2023, and all the benefits accruing therefrom under 35 U.S.C. § 119, the contents of which in its entirety are herein incorporated by reference.

TECHNICAL FIELD OF INVENTION

The present invention relates to the field of automatic conveyor devices, and in particular to a slidable comb plate structure and an automatic conveyor device configured with the comb plate structure.

BACKGROUND OF THE INVENTION

Automatic conveyor devices such as escalators and moving walkways are commonly used to convey passengers between two fixed platforms. For automatic conveyor devices, the connection area between the moving component and the stationary component, such as the area between the steps in cyclic motion and the fixed platform, is a comparative dangerous area. Due to the relative movement, some dangerous behaviors of passengers may cause shoelaces and other items to enter the connection position.

SUMMARY OF THE INVENTION

The object of the present application is to solve or at least alleviate the problems existing in the prior art.

According to one aspect, an automatic conveyor device is provided, comprising: an entrance platform and an exit platform opposite to each other, and a series of steps running in a loop between the entrance platform and the exit platform, a platform footboard at the entrance platform or the exit platform a comb support plate connected to the platform footboard and slidable along guide rails of the platform footboard along a length direction; and one or more comb plates fixedly mounted onto the comb support plate.

Optionally, in an embodiment of the automatic conveyor device, during normal operation of the automatic conveyor device, the comb plate and the comb support plate remain stable, and the teeth of the comb plate fit into the corresponding grooves of steps, where when a foreign object enters between the comb plate and the steps, the comb plate and the comb support plate slide together along the length direction relative to the platform footboard.

Optionally, in an embodiment of the automatic conveyor device, the comb support plate is slidable relative to the platform footboard by a distance of greater than 100 mm, and optionally, the comb support plate is slidable relative to the platform footboard by a distance of greater than 200 mm.

Optionally, in an embodiment of the automatic conveyor device, the comb support plate and the platform footboard are matched with each other through a plurality of alternately arranged sliding teeth extending along the length direction, where the guide rails are arranged on both sides of the alternately arranged sliding teeth.

Optionally, in an embodiment of the automatic conveyor device, the sliding teeth of the comb support plate and those of the platform footboard have guiding features matched with each other, so as to guide the sliding of the comb support plate relative to the platform footboard.

Optionally, in an embodiment of the automatic conveyor device, the sliding teeth of the comb support plate and those of the platform footboard have stop features, so as to limit the utmost sliding positions of the comb support plate and the platform footboard.

Optionally, in an embodiment of the automatic conveyor device, the platform footboard further comprises a bottom plate, the sliding teeth of the platform footboard are arranged on the bottom plate, the bottom plate has a length greater than that of the sliding teeth of the platform footboard, and the platform footboard further comprises a top plate covering the sliding teeth of the platform footboard.

Optionally, in an embodiment of the automatic conveyor device, the engaging surface between the comb support plate and the platform footboard is a slope, and the comb support plate slides relative to the platform footboard along the slope, resulting in an increase in the gap between the comb plate and the step during the sliding process of the comb support plate.

Optionally, in an embodiment of the automatic conveyor device, a restore spring member is further provided between the comb support plate and the platform footboard.

Optionally, in an embodiment of the automatic conveyor device, the restore spring member is configured as springs respectively arranged on both sides of the alternately arranged sliding teeth of the comb support plate and the platform footboard.

Optionally, in an embodiment of the automatic conveyor device, the device further comprises a displacement sensor arranged on one or both sides of the comb support plate for monitoring displacement of the comb support plate.

Optionally, in an embodiment of the automatic conveyor device, the displacement sensor comprises proximity sensors arranged on both sides of the comb support plate.

The device according to the present invention improves the safety in the connection area between the steps and the platform footboard.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF THE INVENTION

Figure 1:
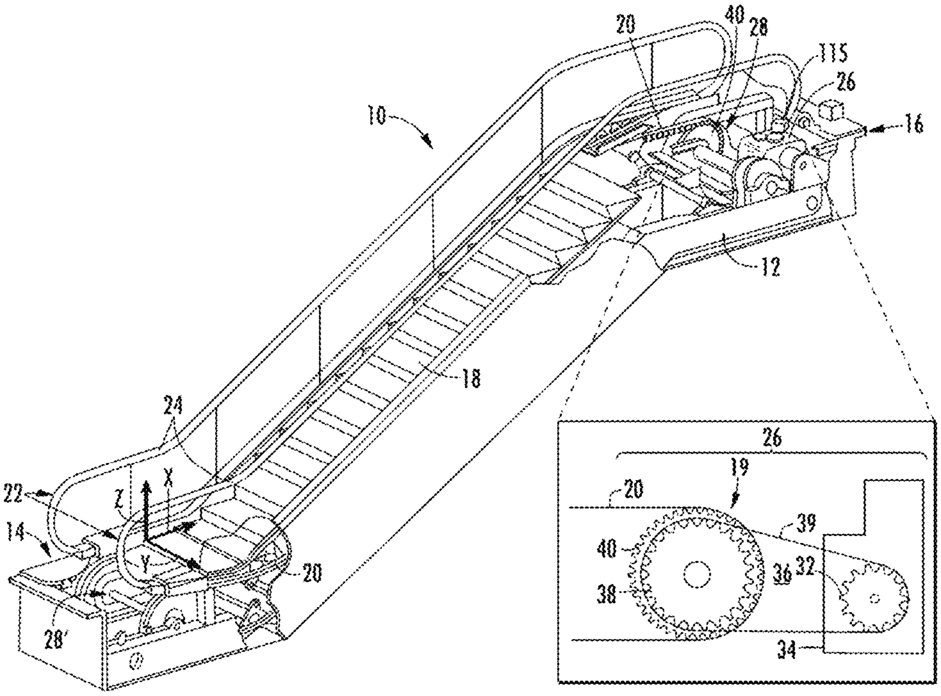
FIG. 1 shows a schematic diagram of an escalator device.

FIG. 1 illustrates an escalator 10. It should become apparent in the ensuing description that the invention is applicable to other passenger conveyor systems, such as moving walks. The escalator 10 generally includes a truss 12 extending between a lower landing 14 and an upper landing 16. A plurality of sequentially connected steps or step plates 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the steps 18 and/or handrails 24 through the step chain 20. The drive machine 26 operates to move the steps 18 in a chosen direction at a desired speed under normal operating conditions.

The steps 18 make a 180 degree heading change in a turn-around area 19 located under the lower landing 14 and upper landing 16. The steps 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member 38, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments, the second drive member 38 may be an idle gear or similar device that is driven by the operative connection between the first drive member 32 and the second drive member 38 by means of tension member 39. The tension member 39 travels around a loop set by the first drive member 32 and the second drive member 38, which hereinafter may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the steps 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Although described herein as a particular escalator drive system and particular components, this is merely exemplary, and those of skill in the art will appreciate that other escalator system configurations may operate with the invention disclosed herein.

Figure 2:
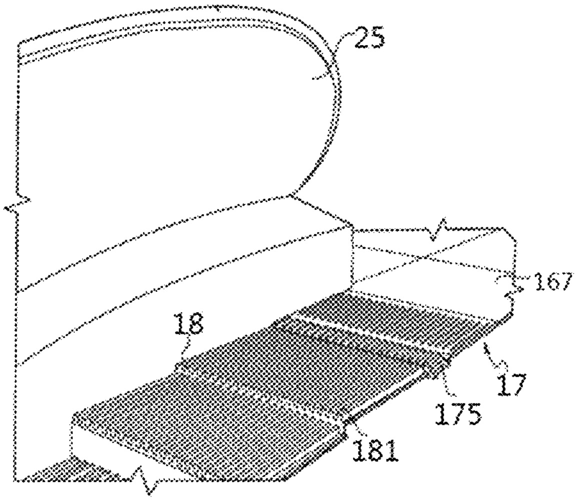
FIG. 2 shows an enlarged view of the connection area between the steps and the platform of an escalator device.

With continued reference to FIG. 2, a partially enlarged view of the upper landing 16 of the automatic conveyor device is shown. A platform footboard 167 covering a machine space 28 is provided at the upper landing 16. Passengers can enter or leave the automatic conveyor device through the platform footboard 167, so the platform footboard 167 can be constructed as an entrance platform footboard or an exit platform footboard. The platform footboard 167 is connected to a comb plate 17 having a plurality of parallel teeth 175 the front ends of which fit into grooves 181 of incoming steps 18 running in a loop. The comb plate 17 and the platform footboard 167 are both fixedly arranged with only a clearance of a few millimeters between them. Although not shown, a similar structure is also provided at the lower landing 14. The structure according to the embodiments of the present invention as described below can be used to replace the comb plate 17 in FIG. 2, so as to improve the safety of the connection area between the steps 18 and the platform footboard 167.

With continued reference to FIGS. 3 to 6, the structure near the comb plate of the automatic conveyor device according to the present invention will be described. The automatic conveyor device according to the present invention includes: a platform footboard 167 and a comb support plate 172. The platform footboard 167 is fixedly arranged at the two ends of the automatic conveyor device, and the comb support plate 172 can be arranged at least at the platform footboard at one end, or arranged at the platform footboards at both ends. The comb support plate 172 is connected to the platform footboard 167 and is slidable along guide rails 165 of the platform footboard 167 along the length direction x-x. One or more comb plates 171 are connected to the end of the comb support plate 172. The comb plate 171 can utilize a structure similar to the comb plate in existing designs. When in use, the teeth of the comb plate 171 fit into the corresponding grooves on the incoming step 18. More specifically, the comb support plate 172 may include a first end 179 and a second end 178 that are opposite to each other, where the first end 179 of the comb support plate is slidably connected relative to the platform footboard 167, and one or more parallel comb plates 171 are arranged at the second end 178 of the comb support plate. The platform footboard 167 may have guide rails 165 to guide the sliding of the comb support plate 172. In some embodiments, for example, guide rails 165 are provided on the two sides of the platform footboard 167.

The comb plate 171 can utilize the same type as the existing comb plate 17 shown in FIG. 2. Therefore, the comb support plate 172 according to the embodiments of the present invention can be achieved by adding a sliding bracket to the existing comb plate, which is simple in structure and easy for modification. In some embodiments, different materials can be selected for the comb plate 171 and the comb support plate 172. For example, the comb plate 171 can be made of aluminum alloy or resin plastic, while the comb support plate 172 can be made of materials with higher strength, such as stainless steel. The comb plate 171 is supported by the comb support plate 172, allowing the comb plate 171 to slide horizontally relative to the platform footboard 167 in a large range along the length direction x-x, so as to provide cushioning in the event of intrusion of foreign objects.

Figure 3:
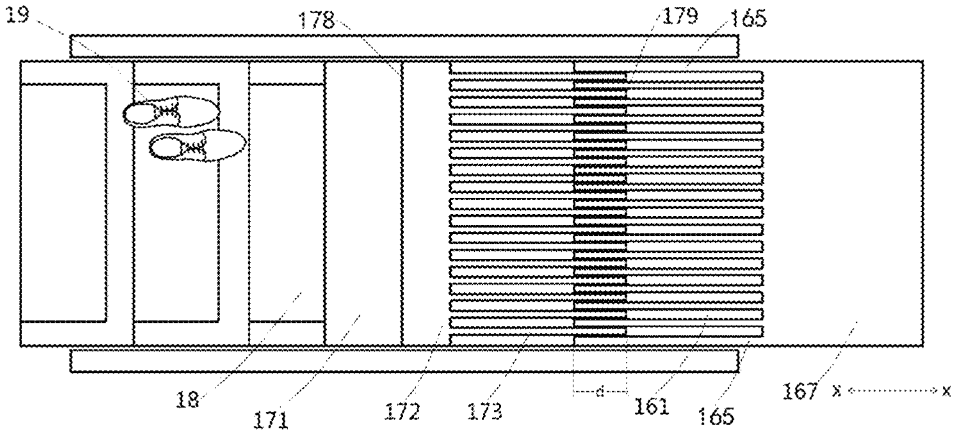
FIGS. 3 and 4 respectively show the top views of the comb support plate and the platform footboard according to an embodiment of the present invention under normal conditions and after sliding.
Figure 4:
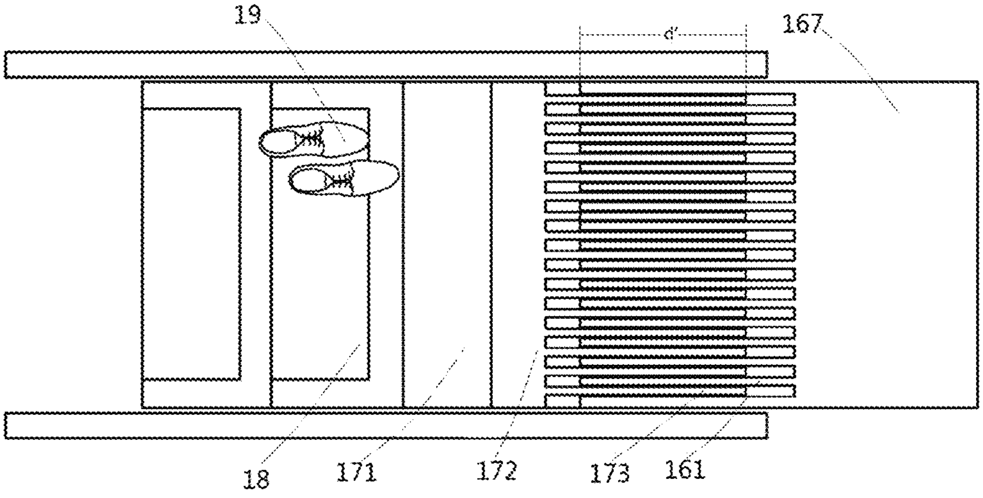
Figure 5:
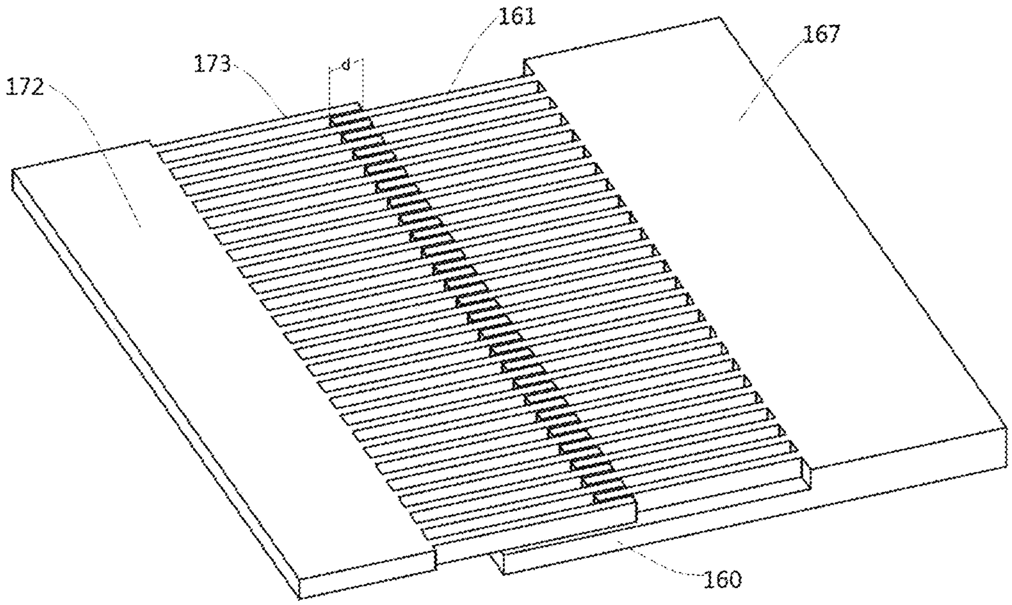
FIGS. 5 and 6 respectively show the three-dimensional views of the comb support plate and the platform footboard according to an embodiment of the present invention under normal conditions and after sliding.
Figure 6:
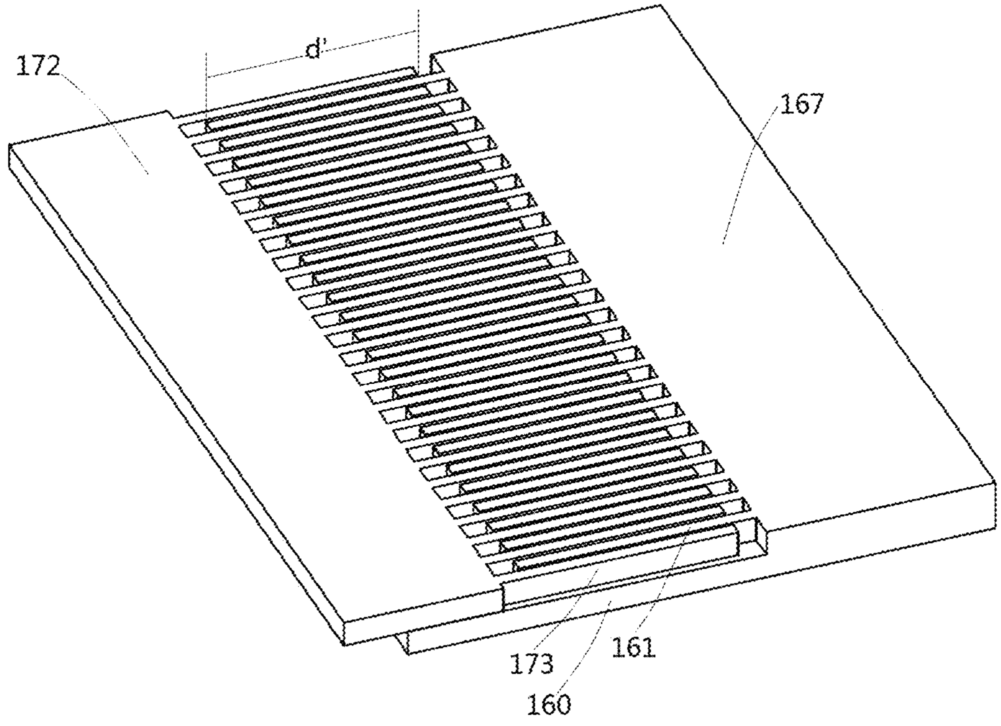

In some embodiments, more specifically, the second end 179 of the comb support plate 172 and the platform footboard 167 are mutually matched through a plurality of alternately arranged sliding teeth extending along the length direction. Specifically, the comb support plate 172 comprises a plurality of sliding teeth 173 extending along the length direction x-x. Similarly, the platform footboard 167 comprises a plurality of sliding teeth 161 extending along the length direction x-x. The sliding teeth 173 of the comb support plate 172 match with the sliding teeth 161 of the platform footboard 167 to achieve sliding of the comb support plate 172 relative to the platform footboard 167. As shown in FIG. 3, in the normal operating state of the automatic conveyor device, the comb support plate 172 remains stable, and the sliding teeth 173 of the second end 179 of the comb support plate 172 and the sliding teeth 161 of the platform footboard 167 overlap by a first overlap length d. Turning to FIG. 4, when foreign objects such as shoes are trapped between the step 18 and the comb plate 171, driven by the step 18, the comb plate 171 and the comb support plate 172 slide with the step 18 relative to platform footboard 167 along the length direction x-x, for example, until the sliding teeth 173 of the second end 179 of the comb support plate 172 and the sliding teeth 161 of the platform footboard 167 overlap by a second overlap length d', as shown in FIG. 4. During this process, the automatic conveyor device will be stopped and the cushioning sliding provided by the comb support plate 172 will avoid hard collisions, thereby preventing damage to the automatic conveyor device or injury to people. It should be appreciated that although in the embodiment shown, the comb support plate 172 and the platform footboard 167 are slidably matched with each other through sliding teeth, in alternative embodiments, however, other linear sliding structures can be used, such as through mechanical structures like slide rails, linear bearings, guide rail pairs, and guide columns. In addition, to facilitate sliding, rolling balls, rollers, and other components can be mounted between the relatively sliding components, or lubricating oil can be provided between the two.

Figure 7:
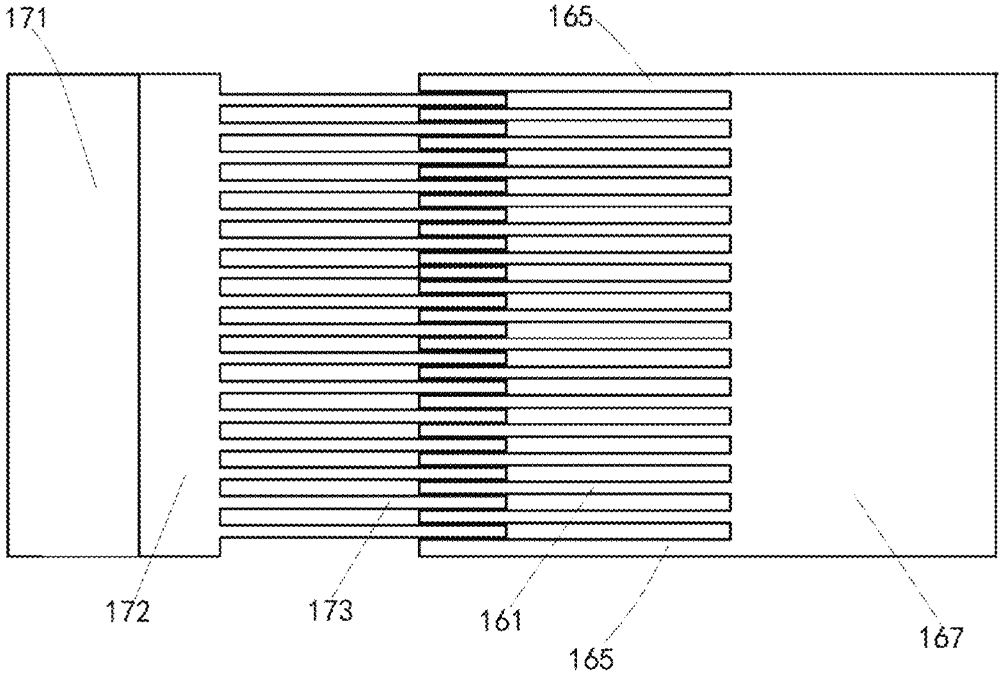
FIG. 7 shows a top view of the comb support plate and the platform footboard according to an embodiment of the present invention.

With continued reference to FIG. 7, in some embodiments, the platform footboard 167 includes guide rails 165 arranged on the two sides of the alternately arranged sliding teeth, where the guide rails may be similar to the guide rail pair of a drawer or utilize other suitable structures. Rolling balls can be provided in the guide rail pair to facilitate sliding, and damping devices can also be provided in the guide rail pair to avoid collisions. In some embodiments, guide rails may be provided between any adjacent sliding teeth 173, 161 of the second end 179 of the comb support plate 172 and of the platform footboard 167.

In some embodiments, the slidable distance of the comb support plate 172 is greater than 100 mm, i.e., the difference between the second overlap length d' and the first overlap length d is greater than 100 mm. In some embodiments, the slidable distance of the comb support plate 172 is greater than 200 mm, i.e., the difference between the second overlap length d' and the first overlap length d is greater than 200 mm. Having a 200 mm sliding cushioning can effectively avoid hard collisions, thereby avoiding damages to people and machines. In some embodiments, the sliding teeth 173 of the comb support plate and the sliding teeth 161 of the platform footboard have mutually matched guiding features, such as one of the adjacent sliding teeth having a protrusion, and the other of the adjacent sliding teeth having a groove-shaped track along the length direction to guide the relative sliding of the two. In some embodiments, rollers or rolling balls may also be arranged between adjacent sliding teeth. In some embodiments, the sliding teeth 173 of the comb support plate and the sliding teeth 161 of the platform footboard have stop features, which, for example, can limit the two from detaching with each other and define the minimum and maximum positions of the sliding between each other and etc. The stop features can also utilize structures such as protrusions and grooves or other suitable mechanical structures.

In some embodiments, the platform footboard 167 also includes a bottom plate 160, where in such embodiments, guide rails 165 can also be arranged on the bottom plate 160. In some embodiments, the sliding teeth 161 of the platform footboard are arranged on the bottom plate 160. In some embodiments, the length of the bottom plate 160 is greater than the length of the sliding teeth 161 on it, and is also greater than the sliding teeth 173 of the second end 179 of the comb support plate 172. The bottom plate 160 provides support for the comb support plate, making the sliding process more stable. Although not shown, in some embodiments, the platform footboard 167 may also be provided with a top plate covering the sliding teeth 161 of the platform footboard, so that the alternately arranged sliding teeth of the platform footboard 167 and the comb support plate 172 are located between the bottom plate and the top plate of the platform footboard 167, thereby providing protection for the sliding teeth and preventing foreign objects from entering the gaps between the sliding teeth.

Figure 8:
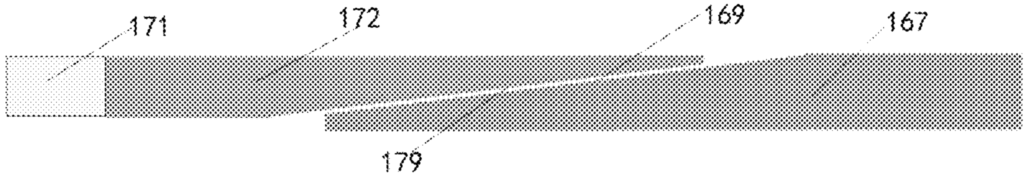
FIGS. 8 and 9 show the side views of the comb support plate and the platform footboard according to another embodiment of the present invention under normal conditions and after sliding.
Figure 9:
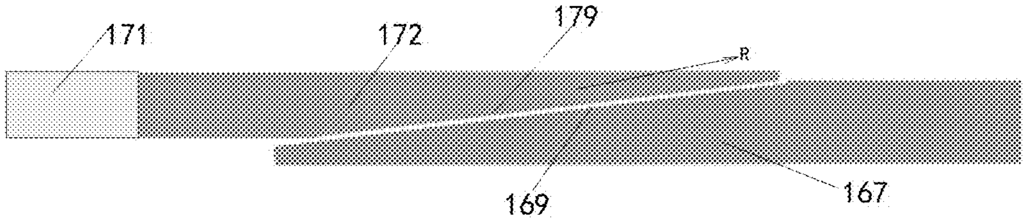

With continued reference to FIGS. 8 and 9, an alternative combination structure of a comb support plate and a platform footboard is illustrated. In this embodiment, the engaging surfaces 169, 179 between the comb support plate and the platform footboard are slopes, where the comb support plate 172 slides relative to the platform footboard 167 along this slope (as shown by arrow R). In this embodiment, the slope should be configured to have a relatively small inclination, such as less than 10 degrees. Although not shown, it is conceivable that the guide rails 165 on the two sides of the platform footboard 167 also extend along this slope. Alternatively, the guide rails can be directly arranged on the slope 169 of the platform footboard 167. Through this arrangement, during the sliding process of the comb support plate 172, the gap between the comb plate 171 and the steps increases, which is conducive to releasing foreign objects, such as shoelaces, that have been entangled in the gap.

Figure 10:
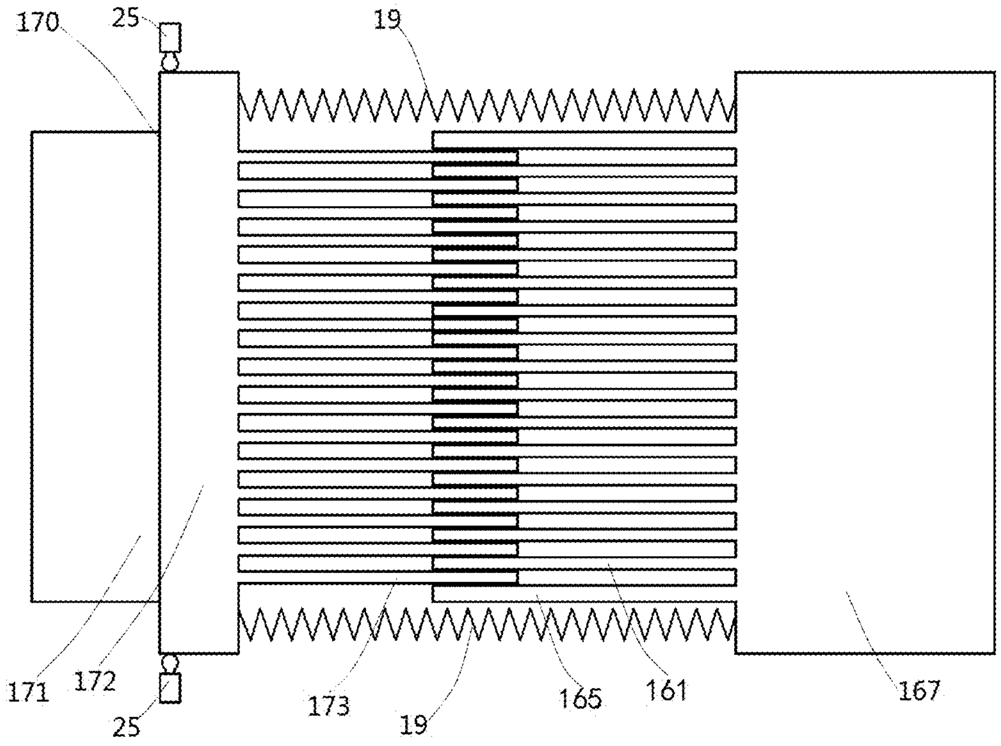
FIG. 10 shows a top view of the comb support plate and the platform footboard according to another embodiment of the present invention.

With continued reference to FIG. 10, in some embodiments, a restore spring member 19 is also provided between the comb support plate 172 and the platform footboard 167. The restore spring member 19 is configured as springs respectively arranged on both sides of the sliding teeth 173, 161 of the comb support plate 172 and the platform footboard 167. The spring has a high stiffness, which prevents the comb support plate 172 from sliding too easy under normal circumstances. However, when a foreign object is drawn in, the thrust of the step plate 18 driven by the drive device compresses the springs, causing the comb support plate 172 to slide relative to the platform footboard 167. On the other hand, the restore spring member 19 can also assist in resetting the comb support plate 172. In alternative embodiments, the restore spring member 19 may take other forms. In other alternative embodiments, a magnetic device can be provided to prevent the comb support plate 172 from sliding too easy.

In some embodiments, the comb plate device also includes displacement sensors 25 located on one or both sides of the comb support plate 172 for monitoring the displacement of the comb support plate 172. In some embodiments, displacement sensor 25 includes proximity sensors located on both sides of comb support plate 172. After the comb support plate 172 moves, the proximity sensors can send a signal to the safety control system of the automatic conveyor device, thereby stopping the automatic conveyor device. In alternative embodiments, displacement sensors 25 may choose other suitable displacement sensors based on light, electricity, or machinery.

The specific embodiments described above in the present application are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. An automatic conveyor device, comprising:

an entrance platform and an exit platform opposite to each other, and a series of steps running in a loop between the entrance platform and the exit platform, a platform footboard at the entrance platform or the exit platform a comb support plate connected to the platform footboard and slidable along guide rails of the platform footboard along a length direction; and one or more comb plates fixedly mounted onto the comb support plate;

wherein the engaging surface between the comb support plate and the platform footboard is a slope, and the comb support plate slides relative to the platform footboard along the slope, resulting in an increase in a gap between the comb plate and the step during the sliding process of the comb support plate.

2. The automatic conveyor device according to claim 1, wherein during normal operation of the automatic conveyor device, the comb plate and the comb support plate remain stable, and teeth of the comb plate fit into corresponding grooves of the steps, where when a foreign object enters between the comb plate and the steps, the comb plate and the comb support plate slide together along the length direction relative to the platform footboard.

3. The automatic conveyor device according to claim 1, wherein the comb support plate is slidable relative to the platform footboard by a distance of greater than 100 mm.

4. The automatic conveyor device according to claim 1, wherein the comb support plate and the platform footboard are matched with each other through a plurality of alternately arranged sliding teeth extending along the length direction, where the guide rails are arranged on both sides of the alternately arranged sliding teeth.

5. The automatic conveyor device according to claim 4, wherein the sliding teeth of the comb support plate and those of the platform footboard have guiding features matched with each other, so as to guide the sliding of the comb support plate relative to the platform footboard.

6. The automatic conveyor device according to claim 4, wherein the sliding teeth of the comb support plate and those of the platform footboard have stop features, so as to limit utmost sliding positions of the comb support plate with respect to the platform footboard.

7. The automatic conveyor device according to claim 4, wherein the platform footboard further comprises a bottom plate, the sliding teeth of the platform footboard are arranged on the bottom plate, the bottom plate has a length greater than that of the sliding teeth of the platform footboard, and the platform footboard further comprises a top plate covering the sliding teeth of the platform footboard.

8. The automatic conveyor device according to claim 1, wherein a restore spring member is further provided between the comb support plate and the platform footboard.

9. The automatic conveyor device according to claim 8, wherein the restore spring member is configured as springs respectively arranged on both sides of the alternately arranged sliding teeth of the comb support plate and the platform footboard.

10. The automatic conveyor device according to claim 1, wherein the automatic conveyor device further comprises a displacement sensor arranged on one or both sides of the comb support plate for monitoring displacement of the comb support plate.

11. The automatic conveyor device according to claim 10, wherein the displacement sensor comprises proximity sensors arranged on both sides of the comb support plate.

12. The automatic conveyor device according to claim 1, wherein the comb support plate is slidable relative to the platform footboard by a distance of greater than 200 mm.

* * * * *